US012764610B2

(12) United States Patent
Dai et al.

(10) Patent No.: US 12,764,610 B2
(45) Date of Patent: Oct. 13, 2026

(54) TECHNIQUES FOR INDICATING RESERVATION OF UNLICENSED BANDS FOR SENSING SIGNALS

(71) Applicant: QUALCOMM Incorporated, San Diego, CA (US)

(72) Inventors: Jing Dai, Beijing (CN); Yuwei Ren, Beijing (CN); Yu Zhang, San Diego, CA (US); Chao Wei, Beijing (CN); Yin Huang, Beijing (CN); Min Huang, Beijing (CN); Qiaoyu Li, Beijing (CN); Jiuyuan Lu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 17/921,536

(22) PCT Filed: Jun. 12, 2020

(86) PCT No.: PCT/CN2020/095833

§ 371 (c)(1),
(2) Date: Oct. 26, 2022

(87) PCT Pub. No.: WO2021/248460

PCT Pub. Date: Dec. 16, 2021

(65) Prior Publication Data

US 2023/0209411 A1 Jun. 29, 2023

(51) Int. Cl.
*H04W 28/26* (2009.01)
*H04W 74/0808* (2024.01)

(52) U.S. Cl.
CPC ....... *H04W 28/26* (2013.01); *H04W 74/0808* (2013.01)

(58) Field of Classification Search
CPC ......... H04W 74/0816; H04W 74/0808; H04W 28/26; G01S 7/006
See application file for complete search history.

(56) References Cited

U.S. PATENT DOCUMENTS 11,071,105 B2 * 7/2021 Yi ........................ H04W 72/02
2013/0010704 A1 * 1/2013 Kronquist ............ H04W 52/38
370/329

(Continued)

FOREIGN PATENT DOCUMENTS

CN 107950070 A 4/2018
EP 3329713 A1 6/2018

(Continued)

OTHER PUBLICATIONS

International Search Report and Written Opinion—PCT/CN2020/095833—ISA/EPO—Mar. 10, 2021.

(Continued)

*Primary Examiner* — Huy D Vu
*Assistant Examiner* — Bao G Nguyen
(74) *Attorney, Agent, or Firm* — QUALCOMM Incorporated

(57) ABSTRACT

Aspects described herein relate to determining to transmit, at a first time instance, a burst of multiple sensing signals in an unlicensed frequency band, transmitting, at a second time instance, a reservation signal in the unlicensed frequency band to reserve resources in the unlicensed frequency band for at least one of the multiple sensing signals, and transmitting, based on transmitting the reservation signal, the at least one of the multiple sensing signals.

18 Claims, 8 Drawing Sheets

(56) References Cited

U.S. PATENT DOCUMENTS

| | | | |
|---|---|---|---|
| 2017/0034685 A1 | 2/2017 | Jiang et al. | |
| 2017/0034817 A1 | 2/2017 | Park et al. | |
| 2017/0041805 A1 * | 2/2017 | Chandrasekhar | H04L 1/1896 |
| 2017/0111888 A1 | 4/2017 | Dinan | |
| 2017/0230945 A1 * | 8/2017 | Babaei | H04W 74/0808 |
| 2018/0054822 A1 | 2/2018 | Kim et al. | |
| 2018/0199377 A1 * | 7/2018 | Sanderovich | G01S 7/023 |
| 2018/0220428 A1 * | 8/2018 | Sun | H04W 74/02 |
| 2018/0234965 A1 * | 8/2018 | Ahn | H04W 72/21 |
| 2018/0343669 A1 * | 11/2018 | Wang | H04W 74/0816 |
| 2020/0187250 A1 * | 6/2020 | Bhattad | H04W 16/14 |
| 2021/0195468 A1 * | 6/2021 | Nguyen | H04W 28/26 |
| 2022/0078845 A1 * | 3/2022 | Xu | H04L 5/0053 |

FOREIGN PATENT DOCUMENTS

| | | |
|---|---|---|
| KR | 20160055044 A | 5/2016 |
| WO | 2017030603 A1 | 2/2017 |

OTHER PUBLICATIONS

ZTE: "Discussion on NR Operation in Unlicensed Spectrum", 3GPP TSG RAN WG1 Meeting #86, R1-167089, Goteborg, Sweden, Aug. 22, 2016-Aug. 26, 2016, pp. 1-7, Aug. 26, 2016 (Aug. 26, 2016) Section 5.

Petrov V., et al., "On Unified Vehicular Communications and Radar Sensing in Millimeter-Wave and Low Terahertz Bands", IEEE Wireless Communications, Jan. 21, 2019, vol. 26, No. 3, pp. 146-153, XP093072922, ISSN: 1536-1284, DOI: 10.1109/MwC.2019.1800328, paragraph [ III.B]; figure 2.

Supplementary Partial European Search Report—EP20940355—Search Authority—The Hague—Jan. 22, 2024.

Supplementary European Search Report—EP20940355—Search Authority—The Hague—Apr. 16, 2024.

"Discusssion on NR Operation in Unlicensed Spectrum", 3GPP TSG RAN WG1 Meeting #86, R1-167089-8.1.3.2 Discussion on NR Operation in ULSPEC, 3rd Generation Partnership Project, Mobile Competence Centre, 650, Route Des Lucioles, F-06921 Sophia-Antipolis Cedex, France, vol. Ran WG1, No. Goteborg, 20, Aug. 22, 2016, pp. 1-7, Whole Document.

* cited by examiner

TECHNIQUES FOR INDICATING RESERVATION OF UNLICENSED BANDS FOR SENSING SIGNALS

This application is a 35 U.S.C. § 371 National Phase of International Patent Application No. PCT/CN2020/095833, entitled "TECHNIQUES FOR INDICATING RESERVATION OF UNLICENSED BANDS FOR SENSING SIGNALS" filed on Jun. 12, 2020, the contents of which is hereby incorporated by reference in its entirety for all purposes.

BACKGROUND

Aspects of the present disclosure relate generally to wireless communication systems, and more particularly, to communications in unlicensed bands.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless devices can include short range radar sensing functionality that can be used for gesture recognition and/or classification, control of the device, etc., where the sensing functionality can be provided by a sensing chip that sends radar signals using millimeter wave (mmWave) signals. Such devices providing the short range radar sensing can include smart phones or watches that can use a dedicated radar sensor to make gesture classification, a vehicle that includes a short range radar device for in-car based control, etc. Short range radar devices can have modules for transmitting a pre-defined waveform (e.g., frequency-modulated continuous-wave) or pulse, a radar signal processing module for correlating reflected signals and transmitted signals to obtain range/Doppler (velocity)/angle information, and a machine learning module to perform the classification, regression, and/or artificial intelligence to determine the designed action.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining to transmit, at a first time instance, a burst of multiple sensing signals in an unlicensed frequency band, transmitting, at a second time instance, a reservation signal in the unlicensed frequency band to reserve resources in the unlicensed frequency band for at least one of the multiple sensing signals, and transmitting, based on transmitting the reservation signal, the at least one of the multiple sensing signals.

In another aspect, a method of wireless communication is provided. The method includes generating one or more parameters related to transmitting, by a user equipment (UE), a reservation signal to reserve resources of an unlicensed frequency band for transmitting a burst of multiple sensing signals, and transmitting the one or more parameters to the UE.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

Figure 1:
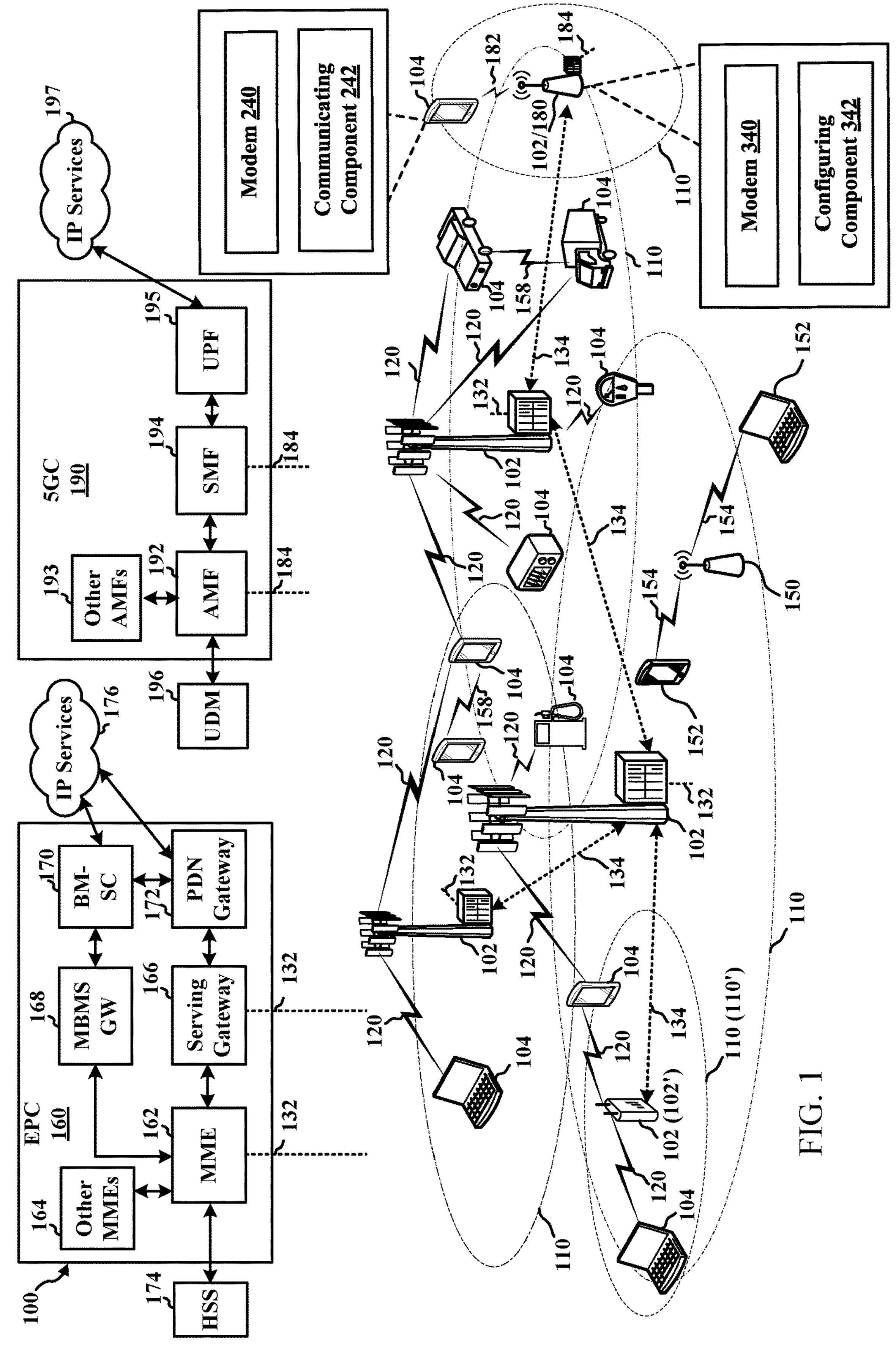
FIG. 1 illustrates an example of a wireless communication system, in accordance with various aspects of the present disclosure.

Additionally, an Appendix is attached that is part of the present disclosure and includes additional description and figures relating to the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to indicating reservation of resources in an unlicensed band for transmitting sensing signals. For example, devices that provide short range radar sensing can use unlicensed bands for transmitting millimeter wave (mmWave) signals to provide high bandwidth and large aperture to extract accurate range/velocity/angle information for environment imaging—sub-6 gigahertz (GHz) may also be used. For example, the devices can performing periodic, semi-persistent, aperiodic, etc. wireless sensing by transmitting bursts of sensing signals, and receiving and correlating reflected signals with the transmitted sensing signals to determine the range/velocity/angle information. In an example of periodic or semi-persistent sensing signal bursts, a device can transmit a burst of sensing signals according to a burst duration (e.g., 250 microseconds (us), which may correlate to 2 slots for subcarrier spacing=120 kilohertz (kHz)). Within a burst, there can be discrete symbols for sensing signal transmission (e.g., either frequency-modulated continuous-wave (FMCW) or pulse). For pulse signals, the device may use another duration and/or periodicity, such as pulse duration=800 nanoseconds (ns) and pulse periodicity=10 us.

Wireless sensing can use both sub-6 GHz bands, such as frequency range 1 (FR1), e.g., 2.4 GHz, 5 GHz) or mmWave bands, such as frequency range 2 (FR2), e.g., 60 GHz. FR2 bands can have very large bandwidth, e.g., 2.16 GHz, to provide high resolution sensing. For a cellular phone or smart watch capable of supporting communication with unlicensed bands, such as Wi-Fi, long term evolution (LTE) in unlicensed band (LTE-U), fifth generation (5G) new radio (NR) in unlicensed band (NR-U), etc., an on-device short range radar may share the radio frequency (RF) modules with the unlicensed band communication transceiver, which can lower cost of manufacturing the device as no additional RF front-end modules may be needed to provide the short range sensing. Whether the device reuses the unlicensed band communication transceiver for short range sensing or not, aspects described herein relate to reserving the unlicensed band for transmitting short range sensing signals to prevent interference from other devices that may not hear the sensing signals, but may cause interference to the sensing signals in the unlicensed band.

Sensing devices may transmit listen-before-talk (LBT) messages in an attempt to reserve resources for transmitting the sensing signals, however, for device sensing with short radar range, the power may be so limited that other nodes may not hear the LBT messages. Thus, other device may transmit data at the same time (e.g., over the same or overlapping time and/or frequency resources) as the sensing function, which may cause interference to the sensing signals and impact performance. Accordingly, aspects described herein relate to transmitting reservation signals for the unlicensed band, which can be heard by nearby devices, to reserve time and/or frequency resources for transmitting and receiving/correlating the sensing signals to improve quality of performing the short range radar sensing in the unlicensed band.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting reservation signals to reserve resources of an unlicensed band for transmitting sensing signals, in accordance with aspects described herein. In addition, some nodes may have a modem 340 and configuring component 342 for configuring a device to transmit reservation signals to reserve resources of an unlicensed band for transmitting sensing signals, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more cameras. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can transmit a reservation signal to reserve resources of an unlicensed bandwidth for transmitting one or more sensing signals, which may correspond to short range radar sensing. For example, communicating component 242 can transmit the reservation signal to be received by nearby nodes and used to indicate that the UE 104 is transmitting over resources of the unlicensed band. Nearby devices can receive the reservation signal and may refrain from transmitting near or over the resources in the unlicensed band to mitigate interference to the UE 104. In addition, for example, communicating component 242 can transmit the reservation signal with higher power than the sensing signals to improve likelihood of receipt by the nearby devices. In one example, configuring component 342 can configure the UE 104 with one or more parameters for transmitting the reservation signal.

Figure 2:
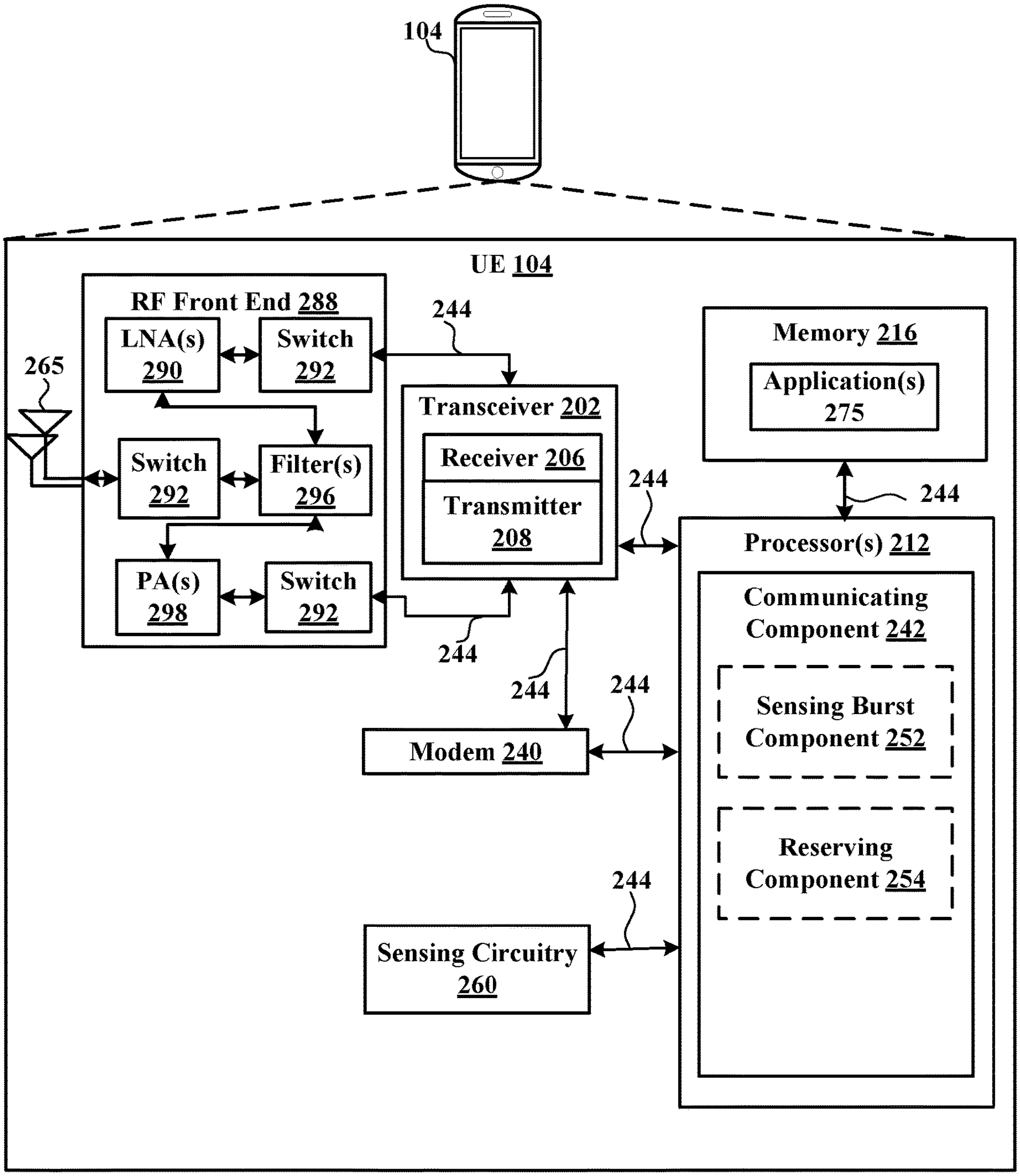
FIG. 2 is a block diagram illustrating an example of a UE, in accordance with various aspects of the present disclosure.
Figure 3:
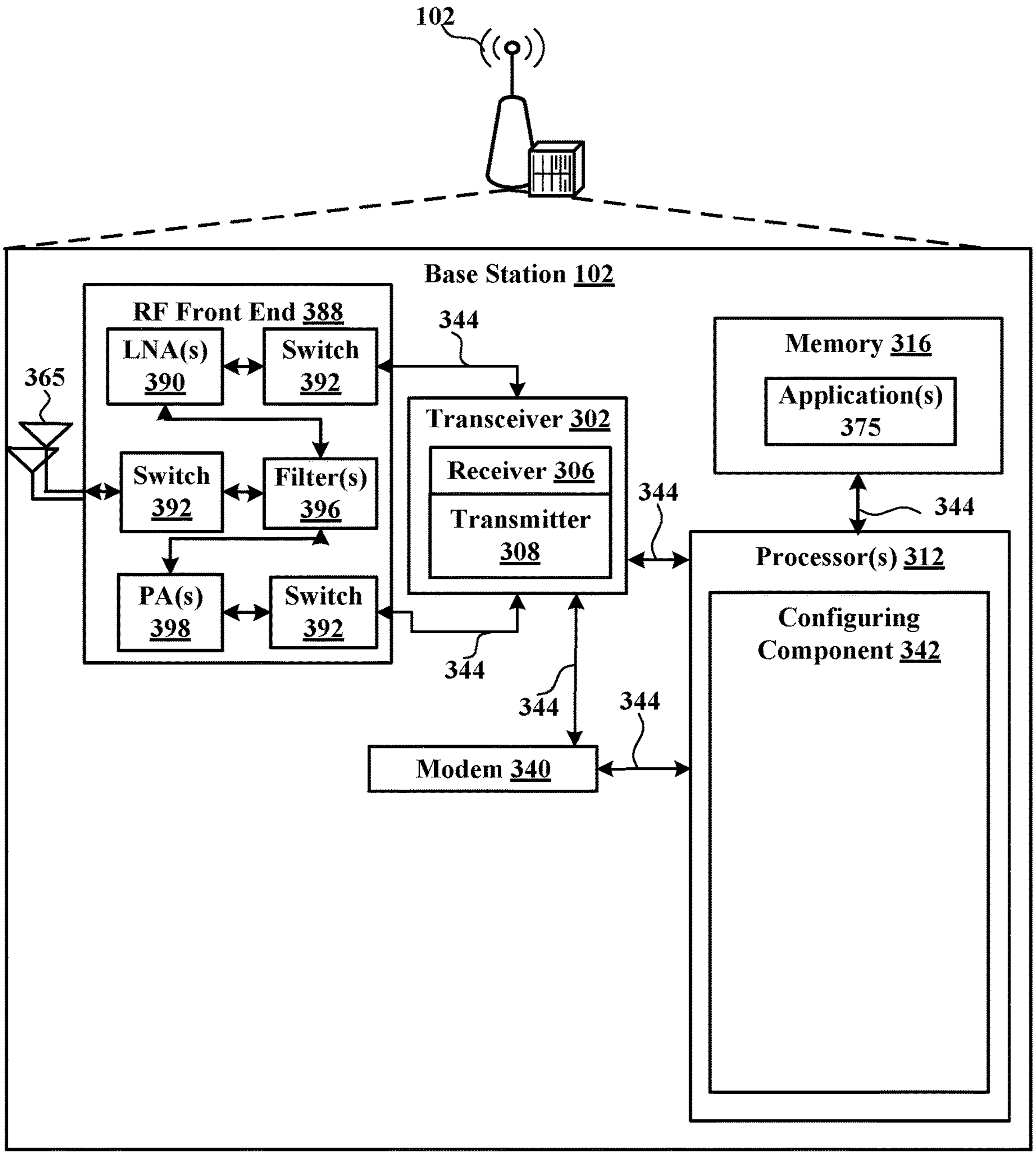
FIG. 3 is a block diagram illustrating an example of a base station, in accordance with various aspects of the present disclosure.
Figure 4:
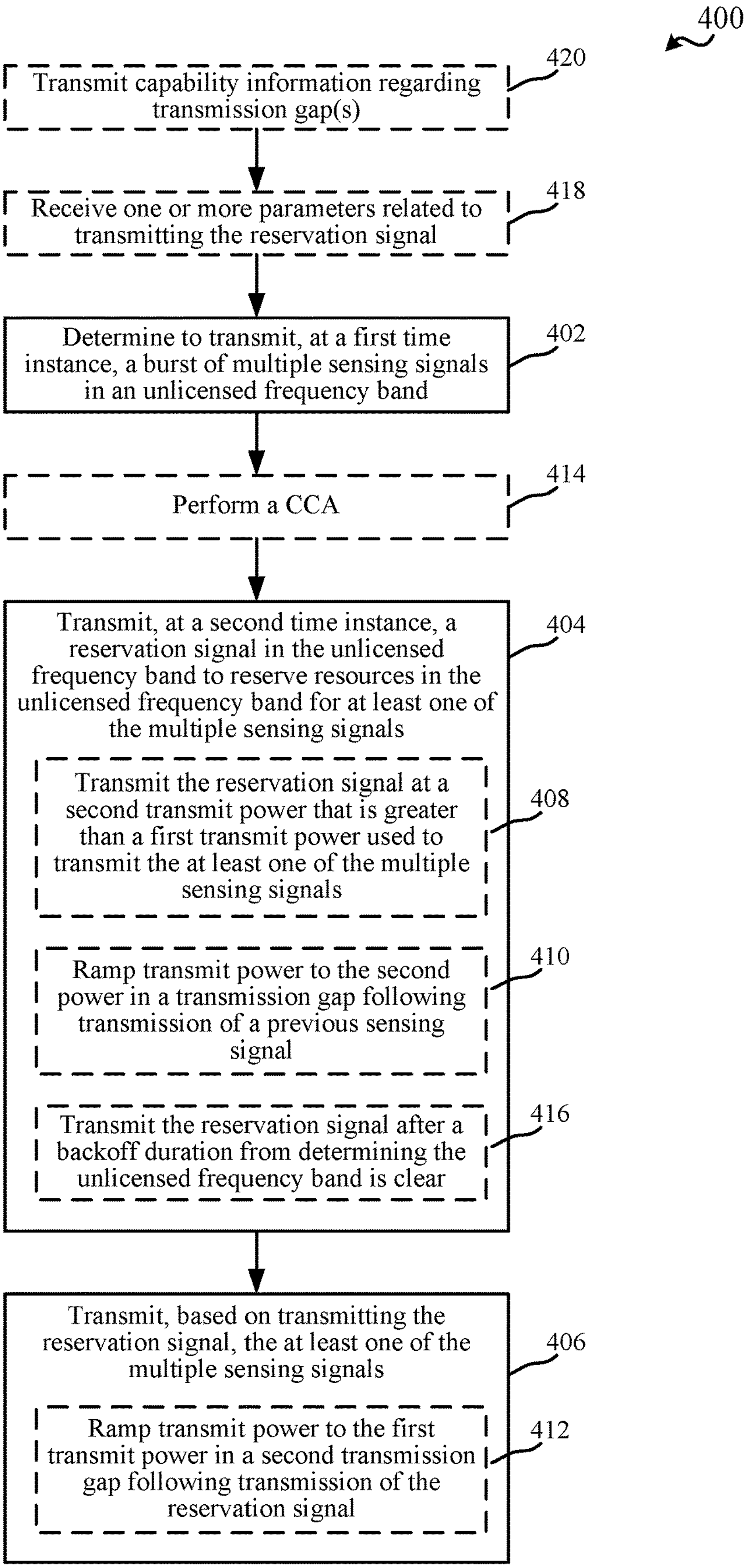
FIG. 4 is a flow chart illustrating an example of a method for transmitting reservation signals related to sensing signals, in accordance with various aspects of the present disclosure.
Figure 5:
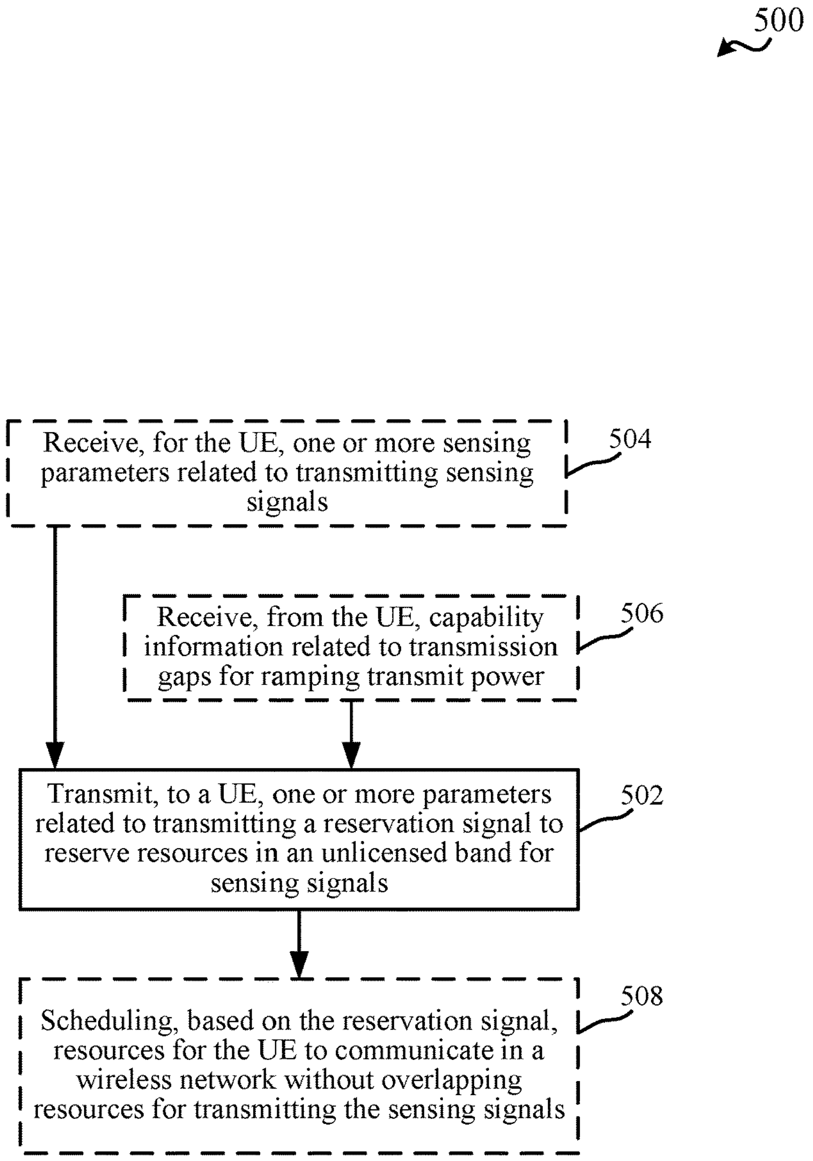
FIG. 5 is a flow chart illustrating an example of a method for configuring a device for transmitting reservation signals related to sensing signals, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting reservation signals to reserve resources of an unlicensed band for transmitting sensing signals, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a sensing burst component 252 for transmitting a sensing signal burst of sensing signals based on one or more parameters, and/or a reserving component 254 for transmitting a reservation signal to indicate reservation of resources of an unlicensed frequency band for transmitting the sensing signal burst, in accordance with aspects described herein.

Moreover, in an example, the UE 104 can include sensing circuitry 260 for performing short range radar sensing to sense, recognize, classify, etc. gestures performed in or over a field of transmitted signals or waves. For example, sensing circuitry 260 can include modules or components for transmitting radar signals with pre-defined waveform (e.g., FMCW or pulse), which may be over unlicensed frequency band. In addition, for example, sensing circuitry 260 can include modules or components for radar signal processing (RSP) that correlates reflected (e.g., received) signals with transmitted signals to determine range, velocity (e.g., Doppler), or angle information of the signals, and/or modules or components machine learning to classify the gathered range, velocity, or angle information into a gesture or desired action using classification, regression, and/or artificial intelligence agents.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device to transmit reservation signals to reserve resources of an unlicensed band for transmitting sensing signals, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for transmitting a reservation signal to indicate reservation of resources of an unlicensed band for transmitting one or more sensing signals, in accordance with aspects described herein. In an example, a UE 104 can perform the functions described in method 400 using one or more of the components described in FIGS. 1 and 2.

In method 400, at Block 402, it can be determined to transmit, at a first time instance, a burst of multiple sensing signals in an unlicensed frequency band. In an aspect, sensing burst component 252, e.g., in conjunction with processor(s) 212, memory 216, transceiver 202, communicating component 242, etc., can determine to transmit, at the first time instance, the burst of multiple sensing signals in the unlicensed frequency band. For example, sensing burst component 252 can determine to transmit the burst of multiple sensing signals based on a burst configuration that can be defined by the UE 104 (e.g., by sensing modules of the UE 104 that perform short range radar sensing), received in a configuration from a base station 102, and/or the like. As described, for example, the sensing signal can correspond to signals transmitted by the UE 104 (e.g., by sensing circuitry 260 on the UE 104) to sense and recognize gestures for controlling the UE 104. For example, the sensing circuitry 260 can transmit the waveform using mmWave, as described, over unlicensed bandwidth that may overlap with LTE-U, NR-U, Wi-Fi, etc.

In method 400, at Block 404, a reservation signal can be transmitted at a second time instance in the unlicensed frequency band to reserve resources in the unlicensed frequency band for at least one of the multiple sensing signals. In an aspect, reserving component 254, e.g., in conjunction with processor(s) 212, memory 216, transceiver 202, communicating component 242, etc., can transmit, at the second time instance, the reservation signal in the unlicensed frequency band to reserve resources in the unlicensed frequency band for at least one of the multiple sensing signals. In an example, the second time instance can precede the first time instance (in time), be interleaved with the first time instance, and/or the like. In any case, nearby devices may receive the reservation signal and can accordingly determine not to transmit over the resources. For example, the nearby devices may perform a clear channel assessment (CCA) or other listen-before-talk (LBT) procedure and may determine that the resources are not clear for transmission based on receiving the reservation signal. In an example, reserving component 254 can transmit the reservation signal according to a CCA or other LBT procedure.

Figure 6:
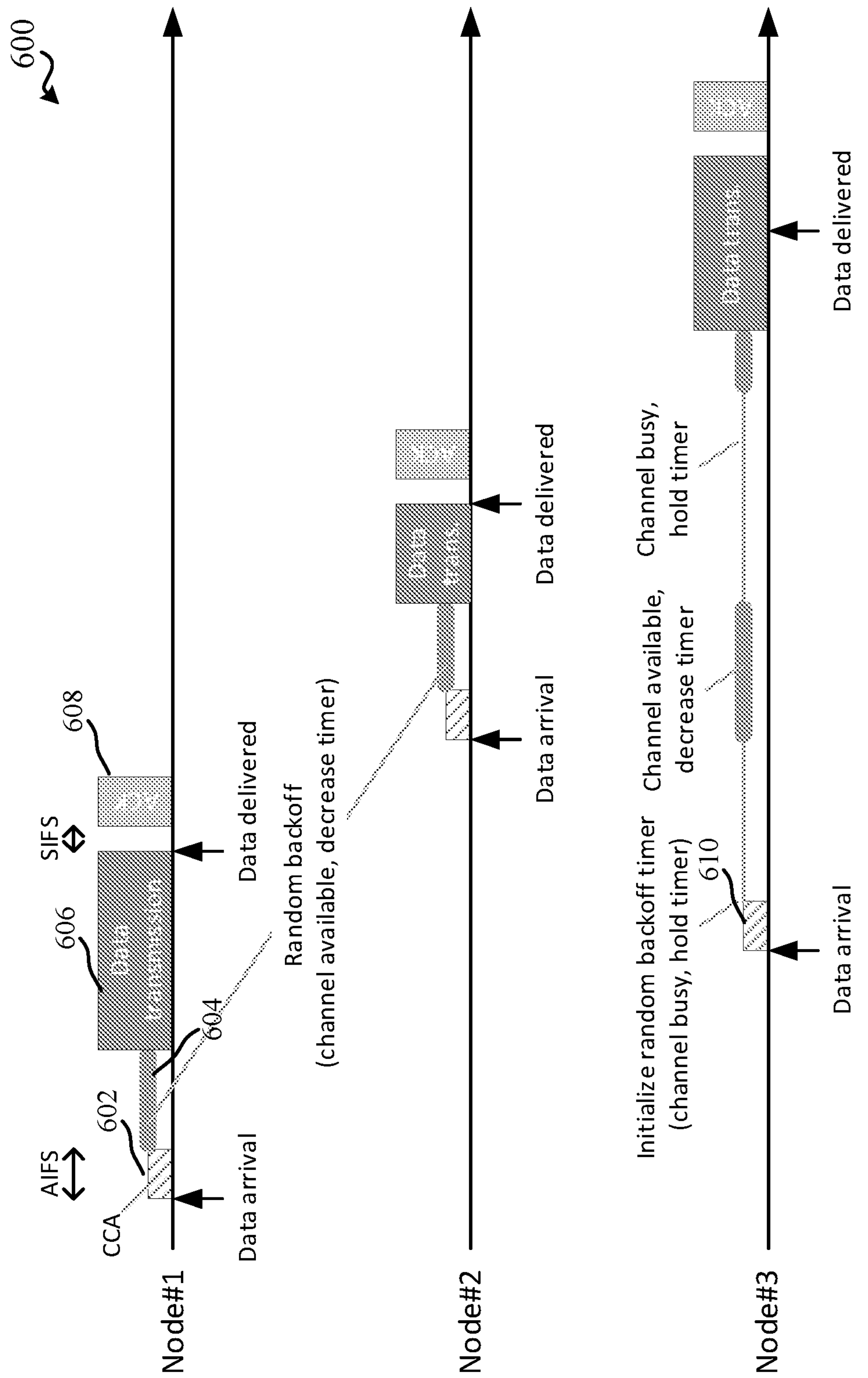
FIG. 6 illustrates a timeline for clear channel assessment (CCA) in Wi-Fi, in accordance with various aspects of the present disclosure.

FIG. 6 illustrates a non-limiting example of a timeline 600 for Wi-Fi communications based on CCA. Timeline 600 can apply to three nodes, as depicted (Node #1, Node #2, Node #3). Node #1 can transmit a CCA signal at 602 for an arbitration inter-frame space (AIFS) duration and can determine the channel is clear. After a random backoff duration 604, Node #1 can transmit data at 606. In Wi-Fi, the LBT procedure can generally include the AIFS, backoff, and data transmission. During AIFS, a transmitter first listens and waits until a channel is available through clear channel assessment (CCA). A typical value for AIFS and CCA can be 25 us. A frequency channel can be declared available if the power level is lower than a threshold (e.g., −62 decibels per milliwatt (dBm)), and no Wi-Fi preamble is detected with a power level higher than another threshold (e.g., −82 dBm). After detected available for at least AIFS, the transmitter can start the backoff procedure at 604. A random backoff timer (e.g., in multiples of 9 us) is initialized, which holds when the channel is detected available with continued CCA, and decreases when the channel is detected busy. Once the backoff timer expires, the node acquired a transmission opportunity (TXOP). As long as the maximum TXOP duration (e.g. 1.504 ms) is not violated, multiple data packets can be transmitted back to back without any LBT between them. In an example, ACK 608 is sent 16 us (this gap is named short inter-frame space (SIFS)) after data transmission. Since SIFS is greater than AIFS, no other node can grab the channel during SIFS. In this example, Node #3 can also perform CCA at 610 while Node #1 is transmitted, but may determine the channel is not available during backoff, and can accordingly refrain from data transmission until after CCA succeeds. In one example, reserving component 254 can transmit the reservation signal using a similar CCA or other LBT procedure.

In method 400, at Block 406, the at least one of the multiple sensing signals can be transmitted based on transmitting the reservation signal. In an aspect, sensing burst component 252, e.g., in conjunction with processor(s) 212, memory 216, transceiver 202, communicating component 242, etc., can transmit, based on transmitting the reservation signal, the at least one of the multiple sensing signals. For example, sensing burst component 252 can transmit the at least one of the multiple sensing signals based on the reservation signal being transmitted, which can be based on CCA determining a clear channel for transmitting the reservation signal. In an example, reserving component 254 can transmit a reservation signal for each sensing signal burst transmitted by the sensing burst component 252 and/or for each pulse or other signal transmitted by the sensing burst component 252 within a sensing signal burst, etc. In one example, this can allow sensing burst component 252 to transmit sensing signals, for sensing circuitry 260, using RF front end 288, or at least a portion thereof. Thus, in an example, UE 104 can use similar resources for transmitting sensing signals and wireless communications to one or more base stations 102 or other nodes using LTE-U, NR-U, Wi-Fi, etc.

Figure 7:
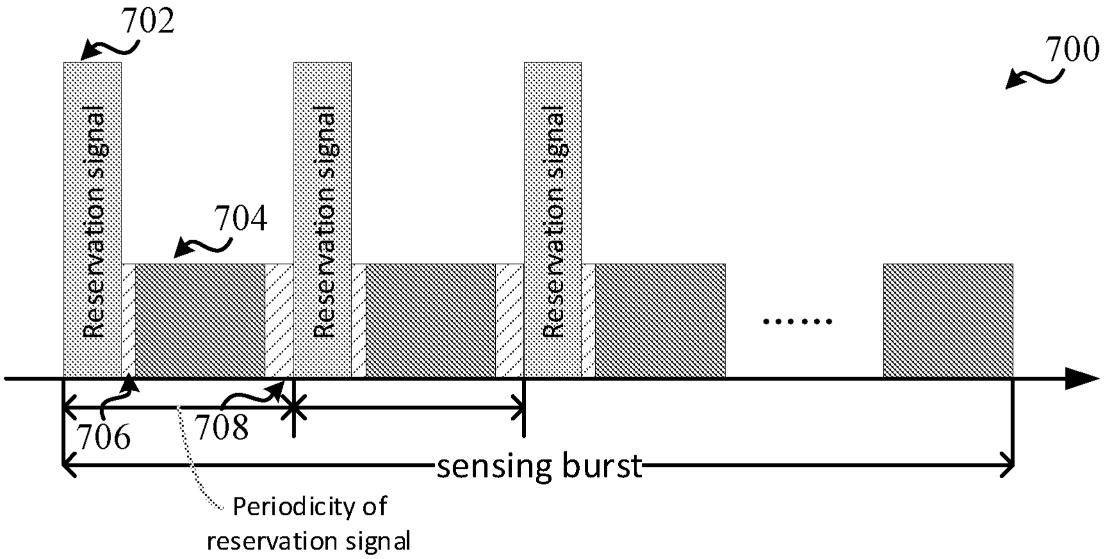
FIG. 7 illustrates a timeline for transmitting reservation signals and sensing signal bursts, in accordance with various aspects of the present disclosure.

FIG. 7 illustrates a specific non-limiting example of a timeline 700 for transmitting sensing signal bursts of pulse signals. In timeline 700, sensing circuitry (e.g., sensing circuitry 260) and/or sensing burst component 252 can transmit a sensing signal burst including multiple sensing signals or pulses 704. In addition, as described above, reserving component 254 can transmit reservation signal 702 before at least one sensing signal 704 (e.g., and/or reservation signals 702 before each sensing signal 704) in time. In addition, for example, reserving component 254 can transmit reservation signal(s) 702 with higher transmit power than sensing signal(s) 704, as described further herein, and may transmit with transmission gaps 706, 708 between the signals, as described further herein, to allow for the change in transmit power. In addition, in an example, reserving component 254 can transmit the reservation signal 702 according to a periodicity, which may be based on the periodicity of the sensing signal(s) 704 within a burst and/or the periodicity of the sensing signal(s) 704 may be based on the periodicity of the reservation signal(s) 702, etc.

In transmitting the reservation signal at Block 404, optionally at Block 408, the reservation signal can be transmitted at a second transmit power that is greater than a first transmit power used to transmit the at least one of the multiple sensing signals. In an aspect, reserving component 254, e.g., in conjunction with processor(s) 212, memory 216, transceiver 202, communicating component 242, etc., can transmit the reservation signal at the second transmit power that is greater than the first transmit power used to transmit the at least one of the multiple sensing signals (e.g., at Block 406). This can increase likelihood of nearby devices hearing the reservation signal and refrain from transmitting during the sensing signal burst. For example, reserving component 254 can transmit the reservation signal at the second power that may be no smaller than a threshold associated with LBT CCA (and thus can be detectable by the CCA of other nodes). In addition, for example, reserving component 254 can transmit the reservation signal at the second power that is higher than the first transmit power of the sensing signals, such to conserve energy when transmitting sensing signals as higher power signals may not be required or desirable for sensing gestures, etc. in reflected signals of the waveform.

In another example, as described, in transmitting the reservation signal at Block 404, optionally at Block 410, the transmit power can be ramped to the second transmit power (e.g., from the first transmit power) in a transmission gap following transmission of a previous sensing signal. In an aspect, reserving component 254, e.g., in conjunction with processor(s) 212, memory 216, transceiver 202, communicating component 242, etc., can ramp the transmit power (e.g., the transmit power in RF front end 288) to the second transmit power in the transmission gap following transmission of the previous sensing signal. For example, referring to FIG. 7, reserving component 254 can ramp the transmit power in transmission gap 708 and similar transmission gaps.

Similarly, in an example, in transmitting the at least one sensing signal at Block 406, optionally at Block 412, the transmit power can be ramped (e.g., ramped down) to the first transmit power (e.g., from the second transmit power) in a transmission gap following transmission of the reservation signal. In an aspect, sensing burst component 252, e.g., in conjunction with processor(s) 212, memory 216, transceiver 202, communicating component 242, etc., can ramp the transmit power (e.g., the transmit power in RF front end 288) to the first transmit power in the transmission gap following transmission of the reservation signal. For example, referring to FIG. 7, sensing burst component 252 can ramp the transmit power down in transmission gap 706 and similar transmission gaps. In an example, the transmission gap for ramping up to the second transmit power and for ramping down to the first transmit power can be of different duration.

In another example, as described, in method 400, optionally at Block 414, a CCA can be performed before (or as part of) transmitting the reservation signal. In an aspect, reserving component 254, e.g., in conjunction with processor(s) 212, memory 216, transceiver 202, communicating component 242, etc., can perform the CCA, and can transmit the reservation signal based on the CCA. Thus, in transmitting the reservation signal at 404, optionally at Block 416, the reservation signal can be transmitted after a backoff duration from determining that the unlicensed frequency band is clear (e.g., based on the CCA). In an example, as shown in FIG. 6, reserving component 254 can perform the CCA, as does Node #1 performing CCA 602, and can transmit the reservation signal after backoff duration, which can be the same as the backoff duration 604 for Wi-Fi or another backoff duration defined for reservation signals. In one example, a base station 102 can configure the backoff duration for reservation signals, as described further herein. This may provide compatibility with Wi-Fi LBT rules.

In another example, to provide compatibility with Wi-Fi LBT rules, reserving component 254 can transmit the reservation signal according to a periodicity that is equal to or smaller than the AIFS of Wi-Fi (e.g., 25 us). In another example, to provide compatibility with LTE-U or NR-U LBT rules, reserving component 254 can transmit the reservation signal according to a periodicity that is equal to or smaller than a defer periodicity of LTE or NR with unlicensed bands (e.g., 25 us, and the defer periodicity can be a similar concept as AIFS in Wi-Fi). Moreover, for example, reserving component 254 can transmit the reservation signal to occupy full or partial frequency resources of the sensing signals.

In addition, for example, reserving component 254 can transmit the reservation signal to indicate sensing information to other nodes. For example, the reservation signal may include an indication that it is for the purpose of sensing signals, which may be based on a dedicated sequence used to transmit the reservations signal. A receiving node can determine the reservation signal is for sensing signals based on the sequence and may determine a behavior in response. In another example, the sensing information in, or represented by, the reservation signal may include an indication of sensing signal resources (e.g., time domain and/or frequency domain resource), which may be indicated to include resources used for the reservation signal, as an offset from the resources used for the reservation signal, etc. In this example, indicated sensing signal resources may not be used by other nodes to transmit wireless communications in the unlicensed frequency band.

In method 400, optionally at Block 418, one or more parameters related to transmitting the reservation signal can be received. In an aspect, reserving component 254, e.g., in conjunction with processor(s) 212, memory 216, transceiver 202, communicating component 242, etc., can receive one or more parameters related to transmitting the reservation signal. In an example, reserving component 254 can receive the one or more parameters in a configuration from a baes station 102. Thus, in one example, the base station 102 can configure the UE 104 to transmit the reservation signal for reserving resources for the sensing signals. This can allow the base station 102 to schedule the UE 104 and/or other UEs based on the parameters provided to mitigate interference to sensing signals transmitted by the UE 104 for the purpose of performing short range sensing, as described. The one or more parameters may include a periodicity, duration, etc. for the reservation signals, a transmit power for the reservation signals, a transmission gap for ramping transmit power for the reservation signals (and/or for corresponding sensing signals), a backoff duration, etc. In any case, reserving component 254 can transmit reservation signals based on the parameters in the configuration.

In method 400, optionally at Block 420, capability information regarding transmission gap(s) can be transmitted. In an aspect, reserving component 254, e.g., in conjunction with processor(s) 212, memory 216, transceiver 202, communicating component 242, etc., can transmit capability information regarding transmission gap(s) (e.g., to a base station 102). In an example, reserving component 254 can receive the one or more parameters at Block 418, which may include the transmission gap configuration, based on transmitting the capability information. For example, reserving component 254 can transmit the capability information in radio resource control (RRC) or other higher layer signaling to the base station 102, which may be based on a request from the base station 102 (e.g., received in other RRC signaling), etc.

FIG. 5 illustrates a flow chart of an example of a method 500 for configuring a device for transmitting reservation signals for sensing signals, in accordance with aspects described herein. In an example, a base station can perform the functions described in method 500 using one or more of the components described in FIGS. 1 and 3.

In method 500, at Block 502, one or more parameters related to transmitting a reservation signal to reserve resources in an unlicensed band for sensing signals can be transmitted to a UE. In an aspect, configuring component 342, e.g., in conjunction with processor(s) 312, memory 316, transceiver 302, etc., can generate and/or transmit, to the UE, one or more parameters related to transmitting the reservation signal to reserve resources in the unlicensed band for sensing signals. As described, for example, the one or more parameters may include a periodicity, duration, etc. for the reservation signals, a transmit power for the reservation signals, a transmission gap for ramping transmit power for the reservation signals (and/or for corresponding sensing signals), a backoff duration, etc. Configuring component 342 can transmit the one or more parameters to the UE 104 in RRC or other higher layer signaling, in downlink control information (DCI), etc., though in other examples, the UE 104 can generate and/or otherwise determine parameters for transmitting the reservation signals.

In method 500, optionally at Block 504, one or more sensing parameters related to transmitting sensing signals can be received for the UE. In an aspect, configuring component 342, e.g., in conjunction with processor(s) 312, memory 316, transceiver 302, etc., can receive, for the UE, one or more sensing parameters related to transmitting sensing signals. In an example, the one or more sensing parameters may be received from the UE or from another node, and may indicate information related to transmitting sensing signals by the UE, from which information related to the reservation signal can be determined. For example, the one or more sensing parameters may include a periodicity, duration, etc. related to the timing of the UE for transmitting the sensing signals. In this example, configuring component 342 may determine parameters for the reservation signal (e.g., periodicity, duration, transmission gap, etc.) based on the one or more sensing parameters.

In method 500, optionally at Block 506, resources for the UE to communicate in a wireless network can be scheduled, based on the reservation signal, without overlapping resources for transmitting the sensing signals. In an aspect, configuring component 342, e.g., in conjunction with processor(s) 312, memory 316, transceiver 302, etc., can schedule, based on the reservation signal, resources for the UE to communicate in the wireless network without overlapping resources for transmitting the sensing signals. Thus, for example, configuring component 342 can determine opportunities for the UE 104 to transmit the reservation signal, and can determine, based on the opportunity or receiving the reservation signal, not to schedule the UE 104 (and/or other UEs) in resources that may conflict with the sensing signal resources in the unlicensed band.

In method 500, optionally at Block 508, capability information related to transmission gaps for ramping transmit power can be received from the UE. In an aspect, configuring component 342, e.g., in conjunction with processor(s) 312, memory 316, transceiver 302, etc., can receive, from the UE (e.g., UE 104), the capability information related to transmission gaps for ramping transmit power. In this example, configuring component 342 can accordingly configure the UE 104 (e.g., via the one or more parameters transmitted at Block 502) with the transmission gaps for ramping transmit power for transmitting reservation signals and/or for transmitting corresponding sensing signals, as described.

Figure 8:
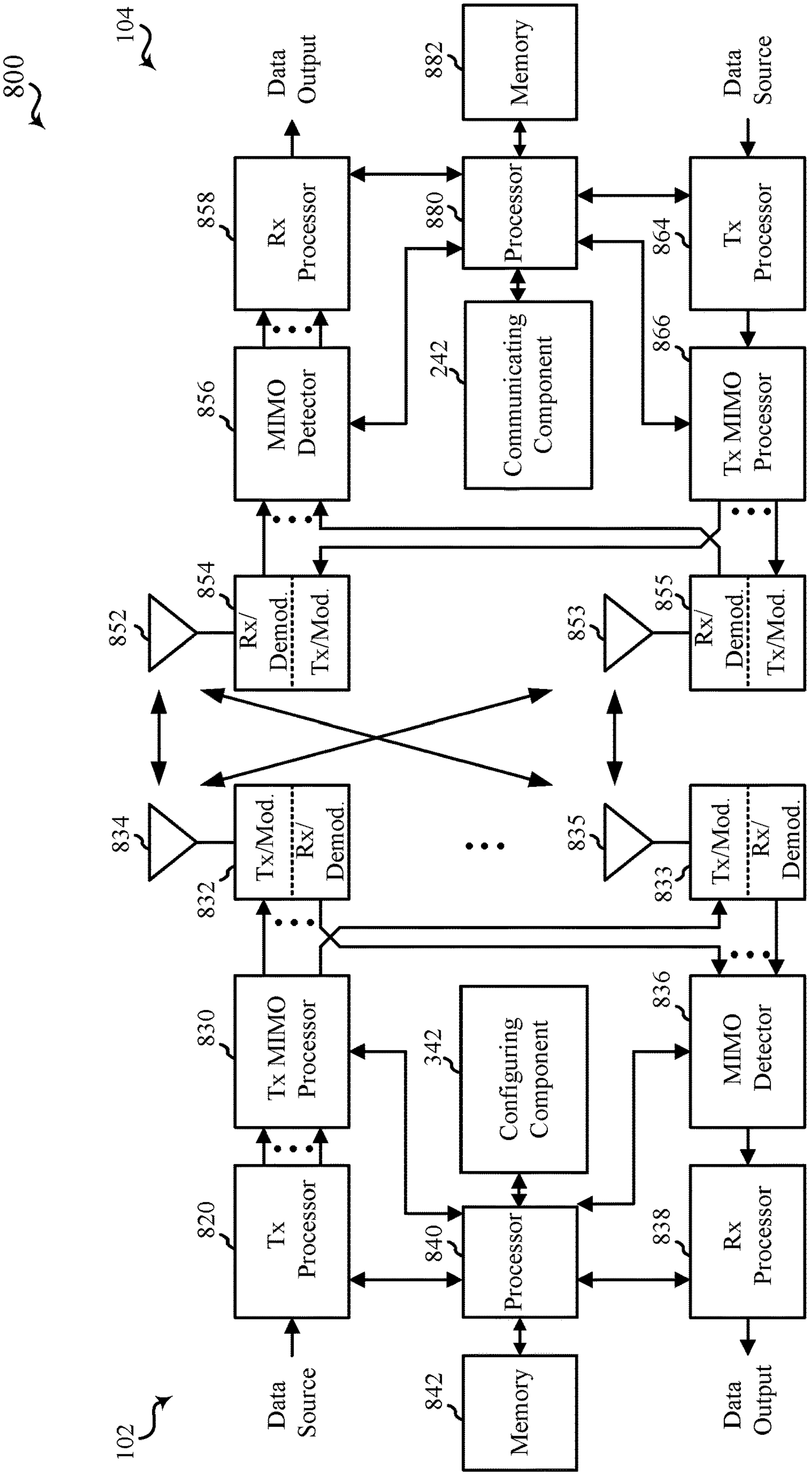
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

Additionally, an Appendix is attached and includes additional description and figures relating to the present disclosure.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
  - determining to transmit, at a first time instance, a burst of multiple sensing signals in an unlicensed frequency band;
  - transmitting, at a second time instance, a reservation signal in the unlicensed frequency band to reserve resources in the unlicensed frequency band for at least one of the multiple sensing signals; and
  - transmitting, based on transmitting the reservation signal, the at least one of the multiple sensing signals.

2. The method of example 1, further comprising performing a clear channel assessment (CCA) before transmitting the reservation signal, and wherein transmitting the reservation signal is based on determining, based on the CCA, that the unlicensed frequency band is clear.

3. The method of example 2, wherein transmitting the reservation signal includes transmitting the reservation signal after a backoff duration from determining, based on the CCA, that the unlicensed frequency band is clear.

4. The method of any of examples 1 to 3, wherein transmitting the reservation signal includes transmitting multiple reservation signals including the reservation signal before each of the multiple sensing signals in the burst.

5. The method of example 4, wherein transmitting the multiple reservation signals and transmitting the multiple sensing signals is based on a periodicity.

6. The method of any of examples 1 to 5, wherein transmitting the reservation signal includes transmitting the reservation signal at a second transmit power that is greater than a first transmit power used to transmit the at least one of the multiple sensing signals.

7. The method of example 6, wherein transmitting the reservation signal includes ramping transmit power to the second transmit power in a transmission gap following transmission of a previous sensing signal.

8. The method of example 7, wherein transmitting the at least one of the multiple sensing signals includes ramping the transmit power to the first transmit power in a second transmission gap following transmission of the reservation signal.

9. The method of example 8, wherein the transmission gap and the second transmission gap are of different durations.

10. The method of any of examples 8 or 9, wherein at least one of the transmission gap or the second transmission gap are configured based on a capability indicated to a base station.

11. The method of any of examples 1 to 10, wherein transmitting the reservation signal includes transmitting the reservation signal over the same or partial frequency resources used for transmitting the at least one of the multiple sensing signals.

12. The method of any of examples 1 to 11, further comprising receiving, from a base station, a configuration indicating one or more parameters for transmitting the reservation signal.

13. The method of example 12, wherein the one or more parameters include at least one of a periodicity for transmitting multiple reservation signals, a duration for the reservation signal, or a transmission gap for power ramping for transmitting the reservation signal or the at least one of the multiple sensing signals.

14. The method of any of examples 1 to 13, wherein the reservation signal indicates information related to the at least one of the multiple sensing signals.

15. The method of example 14, wherein transmitting the reservation signal includes transmitting the reservation signal with a dedicated sequence to indicate the information.

16. The method of any of examples 14 or 15, wherein the information includes an indication of time or frequency resources related to the at least one of the multiple sensing signals.

17. A method of wireless communications, comprising:
  - generating one or more parameters related to transmitting, by a user equipment (UE), a reservation signal to reserve resources of an unlicensed frequency band for transmitting a burst of multiple sensing signals; and
  - transmitting the one or more parameters to the UE.

18. The method of example 17, further comprising receiving, from the UE, one or more sensing parameters related to resources used to transmit the burst of sensing signals, wherein generating the one or more parameters is based on the one or more sensing parameters.

19. The method of any of examples 17 or 18, further comprising receiving, from the UE, capability information related to transmission gaps for ramping transmit power, wherein generating the one or more parameters includes specifying a parameter for one or more transmission gaps between the reservation signal and at least one of the multiple sensing signals.

20. The method of any of examples 17 to 19, further comprising scheduling, based on the reservation signal, resources for the UE or one or more other UEs to communicate in a wireless network without overlapping resources for transmitting, by the UE, the multiple sensing signals.

21. The method of any of examples 17 to 20, wherein the one or more parameters include at least one of a periodicity for transmitting the reservation signal, a duration for the reservation signal, or a transmission gap for power ramping for transmitting the reservation signal or at least one of the multiple sensing signals.

22. An apparatus for wireless communication, comprising:

a transceiver;

a memory configured to store instructions; and one or more processors communicatively coupled with the memory and the transceiver, wherein the one or more processors are configured to perform one or more of the methods of any of examples 1 to 21.

23. An apparatus for wireless communication, comprising means for performing one or more of the methods of any of examples 1 to 21.

24. A computer-readable medium, comprising code executable by one or more processors for wireless communications, the code comprising code for performing one or more of the methods of any of examples 1 to 21.

What is claimed is:

1. An apparatus for wireless communication, comprising:

a processor;

memory coupled with the processor; and instructions stored in the memory and operable, when executed by the processor, to cause the apparatus to:

determine to transmit, at a first time instance, a burst of multiple sensing signals in an unlicensed frequency band;

transmit, at a second time instance, a reservation signal in the unlicensed frequency band to reserve resources in the unlicensed frequency band for at least one of the multiple sensing signals, the reservation signal being transmitted at least in part by ramping up a transmit power to a second transmit power in a transmission gap following transmission of a previous sensing signal in the burst of multiple sensing signals, the second transmit power being greater than a first transmit power used to transmit the at least one of the multiple sensing signals; and transmit, based on transmitting the reservation signal, the at least one of the multiple sensing signals at least in part by ramping down the transmit power to the first transmit power in a second transmission gap following transmission of the reservation signal.

2. The apparatus of claim 1, wherein the instructions, when executed by the processor, cause the apparatus to perform a clear channel assessment (CCA) before transmitting the reservation signal, and wherein the instructions, when executed by the processor, cause the apparatus to transmit the reservation signal based on determining, based on the CCA, that the unlicensed frequency band is clear.

3. The apparatus of claim 2, wherein the instructions, when executed by the processor, cause the apparatus to transmit the reservation signal after a backoff duration from determining, based on the CCA, that the unlicensed frequency band is clear.

4. The apparatus of claim 2, wherein the instructions, when executed by the processor, cause the apparatus to transmit multiple reservation signals including the reservation signal before each of the multiple sensing signals in the burst.

5. The apparatus of claim 4, wherein the instructions, when executed by the processor, cause the apparatus to transmit the multiple reservation signals and transmit the multiple sensing signals based on a periodicity.

6. The apparatus of claim 1, wherein the transmission gap and the second transmission gap are of different durations.

7. The apparatus of claim 1, wherein at least one of the transmission gap or the second transmission gap are configured based on a capability indicated to a base station.

8. The apparatus of claim 1, wherein the instructions, when executed by the processor, cause the apparatus to transmit the reservation signal over the same or partial frequency resources used for transmitting the at least one of the multiple sensing signals.

9. The apparatus of claim 1, wherein the instructions, when executed by the processor, cause the apparatus to receive, from a base station, a configuration indicating one or more parameters for transmitting the reservation signal.

10. The apparatus of claim 9, wherein the one or more parameters include at least one of a periodicity for transmitting multiple reservation signals, a duration for the reservation signal, or a transmission gap for power ramping for transmitting the reservation signal or the at least one of the multiple sensing signals.

11. The apparatus of claim 1, wherein the reservation signal indicates information related to the at least one of the multiple sensing signals.

12. The apparatus of claim 11, wherein the instructions, when executed by the processor, cause the apparatus to transmit the reservation signal with a dedicated sequence to indicate the information.

13. The apparatus of claim 11, wherein the information includes an indication of time or frequency resources related to the at least one of the multiple sensing signals.

14. A method for wireless communication, comprising:

determining to transmit, at a first time instance, a burst of multiple sensing signals in an unlicensed frequency band;

transmitting, at a second time instance, a reservation signal in the unlicensed frequency band to reserve resources in the unlicensed frequency band for at least one of the multiple sensing signals, the reservation signal being transmitted at least in part by ramping up a transmit power to a second transmit power in a transmission gap following transmission of a previous sensing signal in the burst of multiple sensing signals, the second transmit power being greater than a first transmit power used to transmit the at least one of the multiple sensing signals; and transmitting, based on transmitting the reservation signal, the at least one of the multiple sensing signals at least in part by ramping down the transmit power to the first transmit power in a second transmission gap following transmission of the reservation signal.

15. The method of claim 14, further comprising performing a clear channel assessment (CCA) before transmitting the reservation signal, and wherein transmitting the reservation signal is based on determining, based on the CCA, that the unlicensed frequency band is clear.

16. The method of claim 15, wherein transmitting the reservation signal includes transmitting the reservation signal after a backoff duration from determining, based on the CCA, that the unlicensed frequency band is clear.

17. The method of claim 14, wherein transmitting the reservation signal includes transmitting multiple reservation signals including the reservation signal before each of the multiple sensing signals in the burst.

18. The method of claim 14, wherein transmitting the reservation signal includes transmitting the reservation signal over the same or partial frequency resources used for transmitting the at least one of the multiple sensing signals.

* * * * *